(12) United States Patent
Inuzuka et al.

(10) Patent No.: US 8,500,166 B2
(45) Date of Patent: Aug. 6, 2013

(54) STRAP RETENTION DEVICE AND AIRBAG DEVICE

(75) Inventors: Koji Inuzuka, Tokyo (JP); Atsushi Noguchi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/568,552

(22) Filed: Aug. 7, 2012

(65) Prior Publication Data

US 2013/0038046 A1  Feb. 14, 2013

(30) Foreign Application Priority Data

Aug. 10, 2011 (JP) ................. 2011-174544

(51) Int. Cl.
*B60R 21/16* (2006.01)
(52) U.S. Cl.
USPC ........................................... 280/743.2
(58) Field of Classification Search
USPC ........................ 280/739, 743.1, 743.2; 89/1.14
See application file for complete search history.

(56) References Cited

U.S. PATENT DOCUMENTS

| | | | |
|---|---|---|---|
| 6,454,300 B1 | 9/2002 | Dunkle et al. | |
| 7,021,657 B2 | 4/2006 | Kassman et al. | |
| 7,275,763 B2 | 10/2007 | Thomas et al. | |
| 7,419,184 B2 | 9/2008 | Green et al. | |
| 7,510,212 B2* | 3/2009 | Green et al. | 280/743.2 |
| 7,591,482 B2* | 9/2009 | Thomas et al. | 280/739 |
| 7,832,763 B2 | 11/2010 | Stevens | |
| 7,938,444 B2* | 5/2011 | Williams et al. | 280/743.2 |
| 7,946,618 B2 | 5/2011 | Fukawatase et al. | |
| 8,353,525 B2* | 1/2013 | Parks et al. | 280/728.2 |
| 2008/0238062 A1* | 10/2008 | Parks et al. | 280/743.2 |
| 2010/0078924 A1 | 4/2010 | Mitsuo et al. | |

FOREIGN PATENT DOCUMENTS

| | | |
|---|---|---|
| JP | 2008-162584 A | 7/2008 |
| JP | 2008-543656 A | 12/2008 |
| JP | 4649508 B2 | 12/2010 |
| JP | 4678416 B2 | 2/2011 |
| WO | 2006/137989 A2 | 12/2006 |

* cited by examiner

*Primary Examiner* — Joseph Rocca
*Assistant Examiner* — Robert A Coker
(74) *Attorney, Agent, or Firm* — Fitch, Even, Tabin & Flannery, LLP

(57) ABSTRACT

Provided are a strap retention device that can improve the ability to reliably cut a strap, and an airbag device. A strap retention device includes an anchor having a retaining portion for retaining a first end of a strap, and a flat portion in contact with a back surface of the strap; a strap restraint member joined to the anchor for restraining movement of the strap in a width direction; a cutter for cutting the strap on the flat portion; a squib for applying a driving force to the cutter to move the cutter in a direction of the flat portion; and a housing accommodating the cutter and the squib and joined to the anchor.

12 Claims, 8 Drawing Sheets

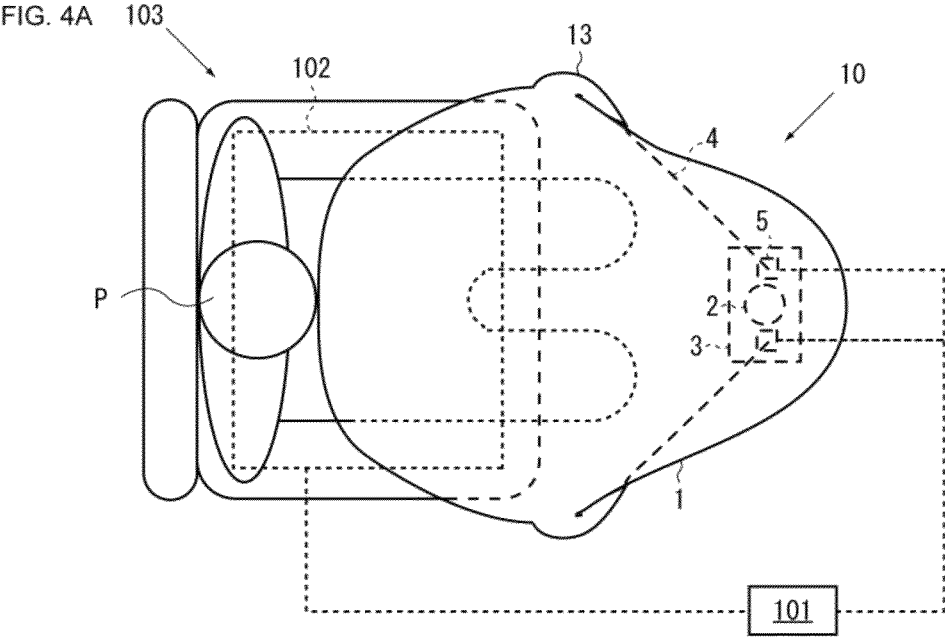
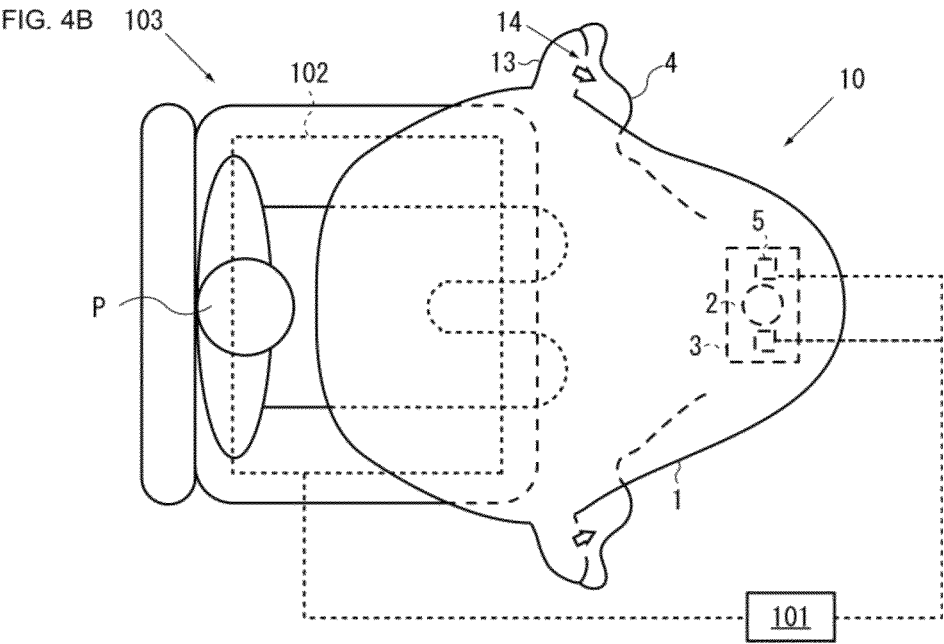

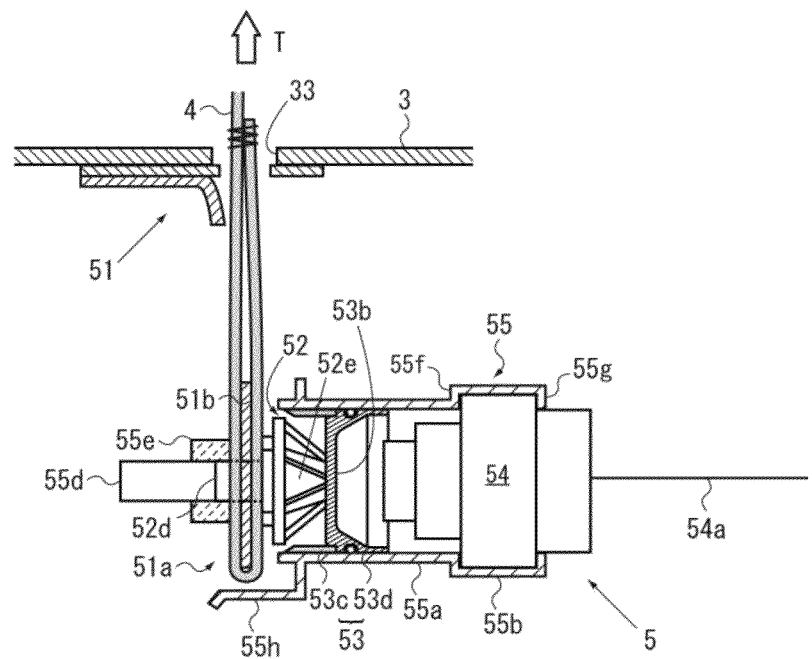
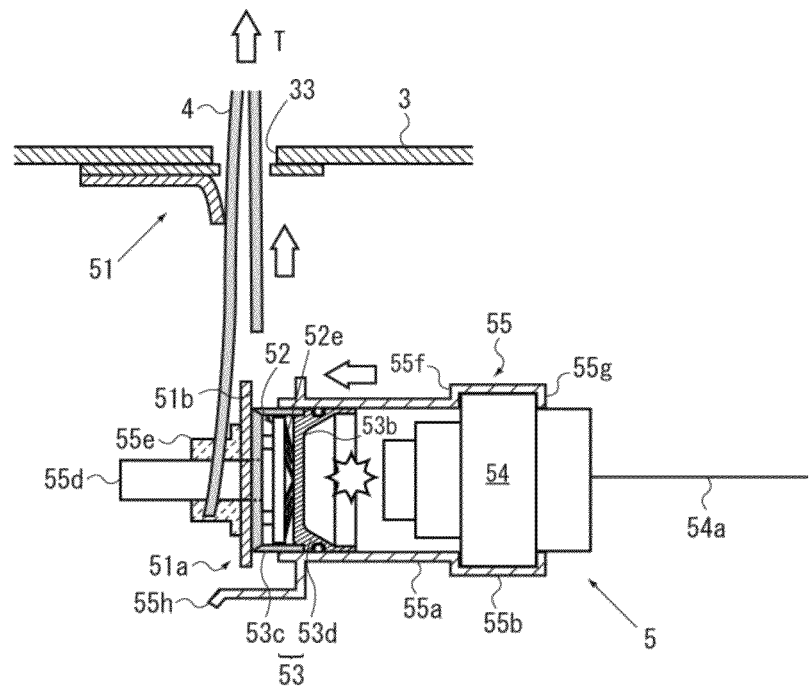

STRAP RETENTION DEVICE AND AIRBAG DEVICE

CROSS-REFERENCE TO RELATED APPLICATION

This application claims priority under 35 U.S.C. §119 to Japanese Patent Application No. JP2011-174544 filed on Aug. 10, 2011, the entire content of which is hereby incorporated herein by reference in its entirety.

FIELD OF THE INVENTION

The present invention relates to strap retention devices and airbag devices, and more specifically, it relates to a strap retention device for retaining a strap in a releasable manner and to an airbag device having this strap retention device.

BACKGROUND OF THE INVENTION

Vehicles, such as cars, are usually equipped with airbag devices that inflate and deploy airbags in the vehicle to absorb impact applied to occupants in an emergency, such as a collision or an abrupt slowdown. Various types of airbag devices have been developed and employed, including driver's seat airbag devices installed in steering wheels, passenger airbag devices installed in instrument panels, side airbag devices installed in side surfaces or seats of vehicles, curtain airbag devices installed in upper parts of doors, knee airbag devices for protecting occupants' knees, and pedestrian airbag devices installed under hoods.

Such an airbag device usually includes an airbag that is normally folded and is inflated and deployed in an emergency, an inflator for supplying gas to the airbag, and a retainer for holding the airbag and the inflator. Furthermore, the airbag sometimes has, for example, a strap for restricting the width of the inflated and deployed airbag or a strap for controlling opening and closing of a vent hole. As a strap retention device for releasably retaining the strap (this may also be called a "strap releasing device"), one using a cutter (cutting edge) has already been proposed (for example, see Japanese Unexamined Patent Application Publication (Translation of PCT Application) No. 2008-543656, Japanese Patent No. 4649508 and Japanese Unexamined Patent Application Publication No. 2008-162584). Note that the strap is a cord or fabric-like member that can apply tension to an object and is sometimes called a tether, an anchor rope, an anchor cable, or the like.

An airbag tether release mechanism disclosed in Japanese Unexamined Patent Application Publication (Translation of PCT Application) No. 2008-543656 includes a housing having an opening through which a tether can pass, a cutter disposed in the housing, and an initiation device (pyrotechnic device) causing the cutter to slide in the housing. The airbag tether release mechanism is configured such that the tether is allowed to pass through the opening and is retained, and when the initiation device is activated, the cutter slides in the housing at least to a position where it is aligned with the opening and cuts the tether.

An actuator disclosed in Japanese Patent No. 4649508 includes a cylindrical casing having an attachment hole through which a tether can pass, a cutter disposed in the casing, and a gas generator axially driving the cutter in the casing. The actuator is configured such that the tether is allowed pass through the attachment hole and is retained, and when the gas generator is activated, the cutter axially moves in the casing and cuts the tether by a shearing force generated as it crosses the attachment hole.

A tether retention system disclosed in Japanese Unexamined Patent Application Publication No. 2008-162584 includes a tether holder attached to a tether, a housing having a hole through which the tether holder can pass, a cutter disposed in the housing, and an initiator causing the cutter to slide in the housing. The tether retention system is configured such that the tether holder is allowed to pass through the hole and is retained, and when the initiator is activated, the cutter slides in the housing, passes through the hole, and cuts the tether.

SUMMARY OF THE INVENTION

However, in the strap retention device (tether release mechanism) disclosed in the above-described Japanese Unexamined Patent Application Publication (Translation of PCT Application) No. 2008-543656, although the strap (tether) is cut by bringing the tip of the cutter into contact with the inner surface of the opening, the strap may be moved to one side in the opening or bent because it is not securely positioned in the opening, resulting in a problem of lack of ability to reliably cut the strap.

Furthermore, the strap retention device (actuator) disclosed in Japanese Patent No. 4649508 has a problem in that, because the cutter cuts the strap (tether) as it crosses (passes) the strap, the ability to reliably cut the strap is influenced by the tension applied to the strap (tensioned state, loose state, etc.). In particular, when the strap is loose, the strap is pulled by the cutter until being cut. Thus, it may be impossible to cut the strap at a desired time.

Furthermore, the strap retention device (tether retention system) disclosed in Japanese Unexamined Patent Application Publication No. 2008-162584 not only has the same problem as the strap retention device (actuator) disclosed in Japanese Patent No. 4649508 but also has a problem in that, when the holder is joined to the strap (tether), the joined portion of the strap and the holder may be broken, depending on the magnitude of the tension generated in the strap. Moreover, if the holder is made of metal parts, the cutter needs to have a high shearing force. This requires an increase of the power of the initiator, resulting in a problem in that the entire device is increased in size.

The present invention has been made in view of these problems, and an object thereof is to provide a strap retention device that can improve the ability to reliably cut the strap, and to provide an airbag device.

According to the present invention, a strap retention device for releasably retaining a first end of a strap having a second end connected to a movable object, the strap retention device including an anchor having a retaining portion for retaining the first end of the strap, and a flat portion in contact with a back surface of the strap; a strap restraint member joined to the anchor for restraining movement of the strap in the width direction; a cutter for cutting the strap on the flat portion; a squib for applying a driving force to the cutter to move the cutter in a direction of the flat portion, and a housing accommodating the cutter and the squib and joined to the anchor, is provided.

Furthermore, according to the present invention, in an airbag device including an airbag that is normally folded and is inflated and deployed in an emergency; an inflator for supplying gas to the airbag; a retainer for holding the airbag and the inflator; and a strap retention device for releasably retaining a first end of the strap having a second end connected to the airbag, the strap retention device including an anchor having a retaining portion for retaining the first end of the strap, and a flat portion in contact with a back surface of the strap; a strap restraint member joined to the anchor for restraining movement of the strap in the width direction; a cutter for cutting the strap on the flat portion; a squib for applying a driving force to the cutter to move the cutter in a direction of the flat portion, and a housing accommodating the cutter and the squib and joined to the anchor, is provided.

In the above-described strap retention device and airbag device, the cutter may be configured to have a straight blade longer than the width of the strap, and a pressure receiving surface for receiving a combustion product generated by the squib. Furthermore, the cutter may be positioned by a shear pin inserted from the outside of the housing. Moreover, the strap restraint member may include a plate-like stopper disposed on the retaining portion to make the back surface of the strap be in contact with the flat portion, and a guide member joined to the anchor and forming a slit through which the strap passes, and the strap may be configured to be cut at a position between the stopper and the guide member.

Furthermore, in the above-described strap retention device and airbag device, the cutter may include a tubular cutter body disposed along an inner surface of the housing and having a diameter larger than the width of the strap, and a piston disposed at a rear end of the cutter body and having a pressure receiving surface for receiving a combustion product generated by the squib. Furthermore, the strap restraint member may include a body having a size capable of being disposed inside the cutter body and able to contact a surface of the strap, and claws formed on the body so as to be adjacent to both sides of the strap and engageable with the anchor, and the strap may be configured to be cut on the outside of the body. Moreover, the body may be formed so as to be foldable toward the cutter body in a flat shape and have a flap reducing the movement of the piston before the squib is activated.

Furthermore, in the above-described strap retention device and airbag device, the retaining portion may include a bolt inserted through the flat portion and penetrating the strap, and a nut threaded onto the bolt; or the retaining portion may include a hook portion engageable with the first end of the strap formed in a loop.

Furthermore, the housing may include a step portion for positioning the tip of the squib inserted therethrough, and an engaging portion engaged with the rear end of the squib by caulking, or a keeper for fixing the squib inserted into the housing.

Furthermore, the strap may be made of base fabric used for airbag or webbing used for seatbelts and the like.

Furthermore, in the above-described airbag device, the retainer may have an opening through which the first end of the strap is led outside, and the strap retention device may be disposed on an outer surface of the retainer at a position adjacent to the opening.

In the above-described strap retention device and airbag device of the present invention, the strap is cut while being fitted to and retained by the flat portion of the anchor. Thus, it is possible to prevent a cutting part from shifting due to a change in tension in the strap, and hence, it is possible to cut the strap on the anchor as if cutting an object on a cutting board. Furthermore, even if the strap is loose, the strap is not pulled by the cutter until being cut, and the strap can be cut at a desired time. Accordingly, it is possible to improve the ability to reliably cut the strap.

By forming the cutter from a straight blade, the pressure receiving surface can be formed on the back surface thereof. Thus, a cutting edge movable in the housing can be formed. Furthermore, by positioning the cutter using the shear pin, the cutter can be prevented from moving before the squib is activated. Moreover, by forming the strap restraint member from a stopper and a guide member, the strap can be retained at both sides of the cutting part thereof. Thus, it is possible to prevent the cutting part from shifting due to a change in tension in the strap.

By forming the cutter from a tubular cutter body and a piston for pressing the cutter body, it is possible to form a cutting edge movable in the housing, to reduce the weight of the cutter, and to reduce the size and weight of the entire device. Furthermore, by configuring such that the strap restraint member can be disposed in the cutter body, the strap can be retained at positions close to the cutting part, whereby the strap can be effectively prevented from shifting. Moreover, by forming a foldable flap on the body of the strap restraint member, it is possible to prevent the cutter from moving before the squib is activated, to maintain the strap and the cutter in a separated state, thereby preventing the strap from being damaged, and to prevent the movement of the cutter from being inhibited when the squib is activated.

By forming the retaining portion from a bolt and a nut, or from a hook portion, the strap can be retained according to the shape of the end of the strap, and thus, the movement of the strap in the longitudinal direction of the strap can be prevented.

By caulking the rear end of the housing to engage the squib therewith, it is possible to retain the squib only by the housing. Thus, there is no need to dispose a keeper for retaining the squib separately from the housing, making it possible to reduce the size and weight of the device. Alternatively, by fitting a keeper to the housing instead of the engaging portion, the squib can be easily fixed to the housing without the need for caulking processing.

By forming the strap from base fabric or webbing, it is possible to easily obtain a member that satisfies predetermined regulation requirements, such as strength, flame resistance properties, and environmental resistance properties, in the field of the vehicle safety device, and it is possible to utilize the remainder or scraps of the material used for the vehicle safety devices.

By disposing the strap retention device on the outer surface of the retainer, the structure of the retainer does not need to be complicated, and the strap retention device is prevented from being subjected to high-temperature gas blown from the inflator.

BRIEF DESCRIPTION OF THE DRAWINGS

FIGS. 3A and 3B are diagrams illustrating the operation of the strap retention device shown in FIG. 2, wherein FIG. 3A shows a retained state, and FIG. 3B shows a released state.

FIGS. 4A and 4B are diagrams showing the operation of the airbag device shown in FIG. 1, wherein FIG. 4A shows a case where an occupant is large, and FIG. 4B shows a case where an occupant is small.

FIGS. 6A-6C are diagrams of a strap restraint member shown in FIG. 5, wherein FIG. 6A is a front view, FIG. 6B is a cross-sectional view taken along line B-B in FIG. 6A, and FIG. 6C is a back view.

FIGS. 7A and 7B are diagrams showing the operation of the strap retention device shown in FIG. 5, wherein FIG. 7A shows a retained state, and FIG. 7B shows a released state.

FIGS. 8A and 8B are diagrams of airbag devices according to other embodiments, wherein FIG. 8A shows the second embodiment, and FIG. 8B shows a third embodiment.

DETAILED DESCRIPTION OF THE PREFERRED EMBODIMENTS

Figure 1:
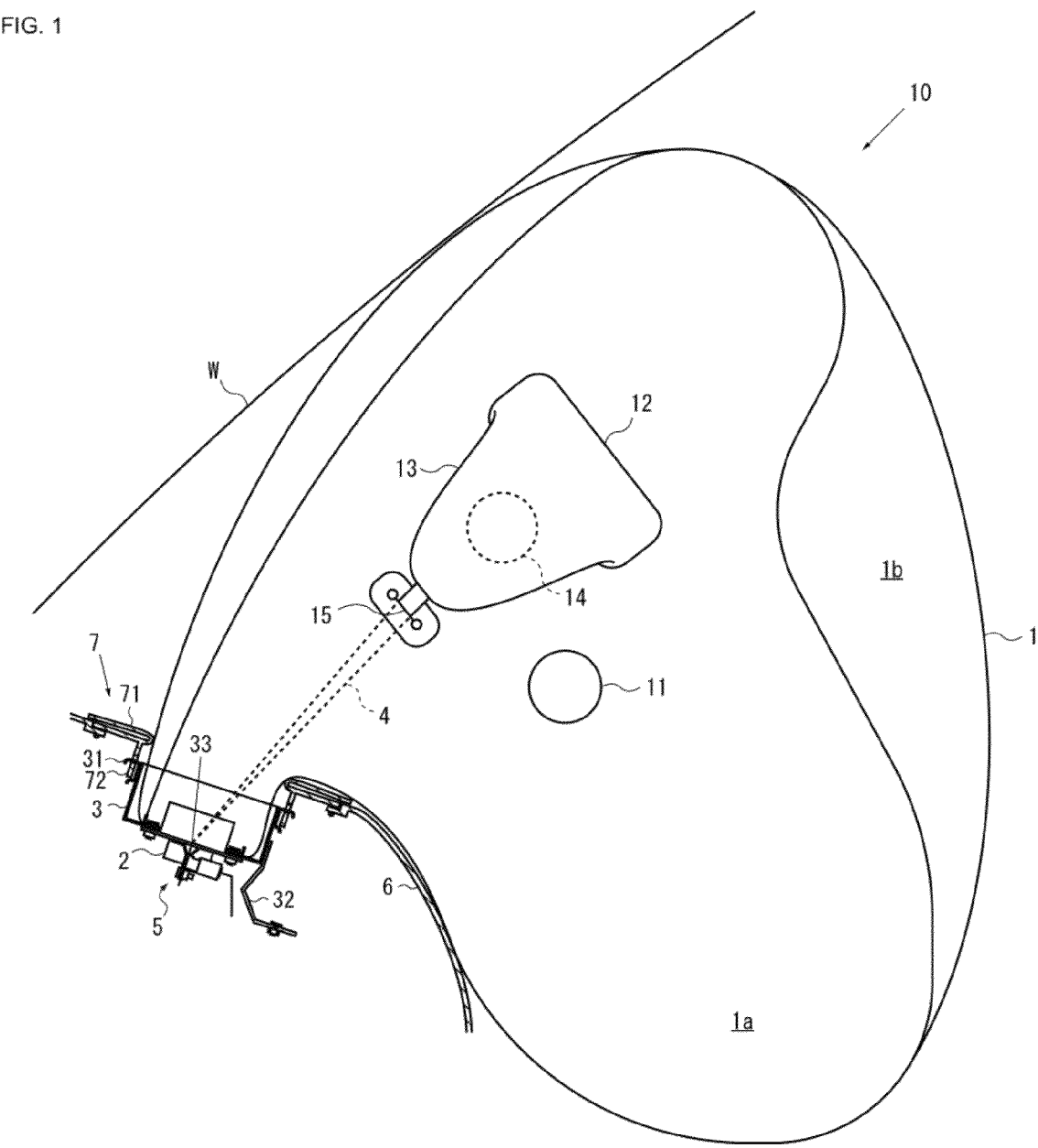
FIG. 1 is a diagram showing the entire configuration of an airbag device according to a first embodiment of the present invention.
Figure 2:
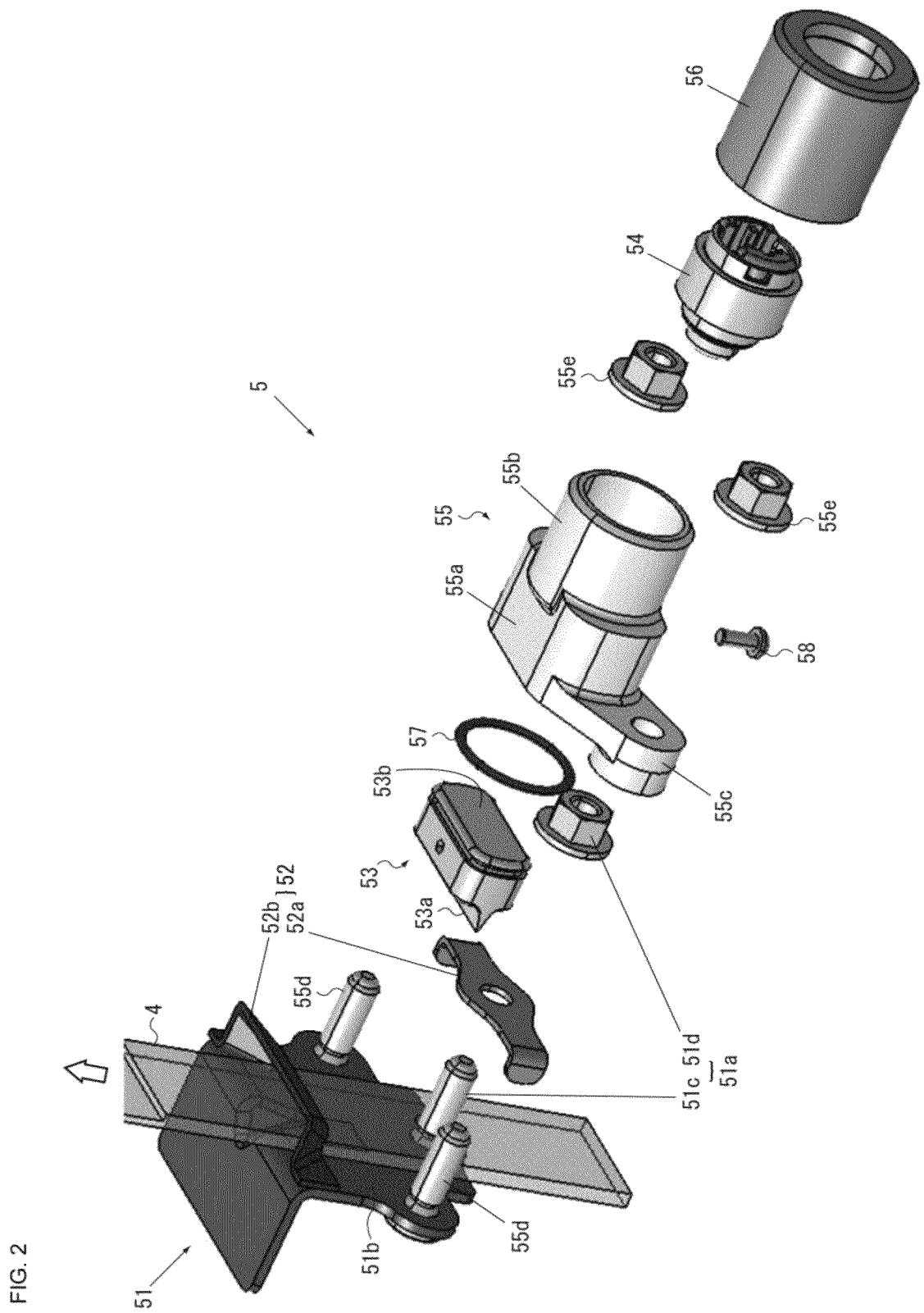
FIG. 2 is a diagram showing the configuration of components of a strap retention device according to the first embodiment of the present invention.
Figure 3A:
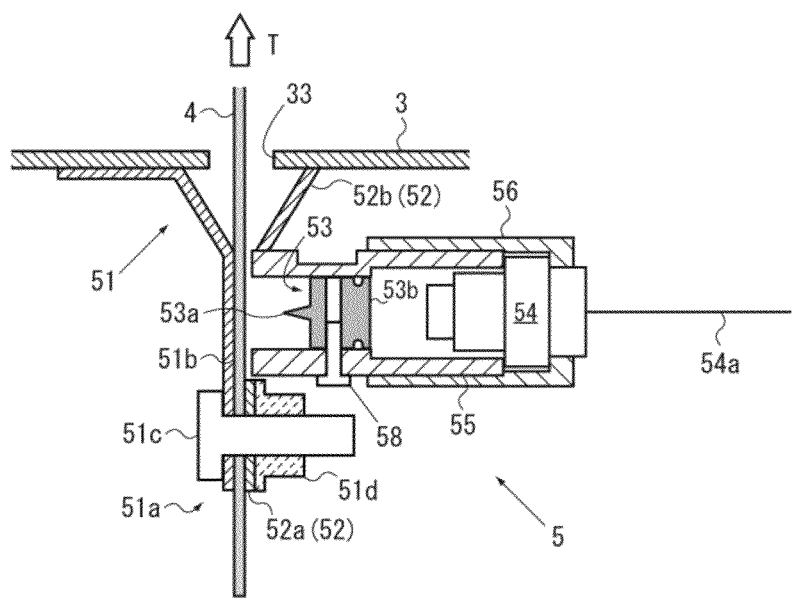
Figure 3B:
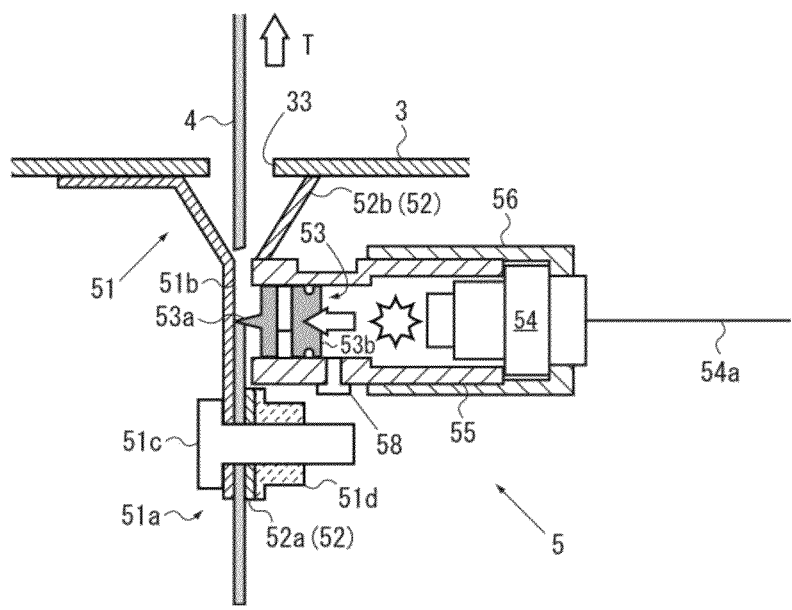

Embodiments of the present invention will be described below using FIGS. 1-8. Herein, FIG. 1 is a diagram showing the entire configuration of an airbag device according to a first embodiment of the present invention. FIG. 2 is a diagram showing the configuration of components of a strap retention device according to the first embodiment of the present invention. FIGS. 3A and 3B are diagrams illustrating the operation of the strap retention device shown in FIG. 2, wherein FIG. 3A shows a retained state, and FIG. 3B shows a released state. FIGS. 4A and 4B are diagrams showing the operation of the airbag device shown in FIG. 1, wherein FIG. 4A shows a case where an occupant is large, and FIG. 4B shows a case where an occupant is small.

As shown in FIGS. 1 and 2, an airbag device 10 according to a first embodiment of the present invention includes an airbag 1 that is normally folded and is inflated and deployed in an emergency, an inflator 2 for supplying gas to the airbag 1, a retainer 3 for holding the airbag 1 and the inflator 2, and a strap retention device 5 for releasably retaining a first end of a strap 4 having a second end connected to the airbag 1. The strap retention device 5 includes an anchor 51 having a retaining portion 51a for retaining the first end of the strap 4 and a flat portion 51b in contact with a back surface of the strap, a strap restraint member 52 joined to the anchor 51 for restraining the movement of the strap 4 in the width direction, a cutter 53 for cutting the strap 4 on the flat portion 51b, a squib 54 for applying a driving force to the cutter 53 to move the cutter 53 in a direction of the flat portion 51b, and a housing 55 accommodating the cutter 53 and the squib 54 and joined to the anchor 51.

The airbag device 10 shown in FIG. 1 is, for example, a passenger airbag device installed by being fixed to an instrument panel 6 disposed in front of a passenger's seat. When the inflator 2 is activated and supplies gas into the airbag 1, the airbag 1 starts to inflate and deploy and bursts into a vehicle cabin by breaking through a door portion 71 of the airbag cover 7. Then, the airbag 1 inflates and deploys in front of an occupant in the vehicle cabin while being in contact with a windshield W.

The inflator 2 is a gas generator for generating gas to be supplied to the airbag 1 and having a substantially circular-disc-like external shape, for example. Although FIG. 1 shows a case where the disc-like inflator 2 is used, a cylinder-type inflator 2 having a substantially cylindrical external shape may also be used. The inflator 2 is connected to an ECU (electronic control unit) (not shown) and is controlled on the basis of measured values of an acceleration sensor or the like. When the ECU detects or predicts a collision or an abrupt slowdown of a vehicle, the inflator 2 is fired by a firing current supplied from the ECU, burning a composition stored in the inflator 2 and generating gas. Then, the gas is supplied to the airbag 1.

The retainer 3 is supported by the airbag cover 7 by, for example, engaging a hook 31 with an engaging hole provided in a leg portion 72 of the airbag cover 7. The retainer 3 is also fixed to an in-vehicle structure inside the instrument panel 6 with a fixing member 32. Note that the structure for attaching the retainer 3 is not limited to that illustrated, and various attaching structures conventionally used may be employed.

Furthermore, the retainer 3 has an opening 33 through which the first end of the strap 4 can be led out. The strap retention device 5 is disposed on the outer surface of the retainer 3 at a position adjacent to the opening 33. The opening 33 is slightly larger than the cross-section of the strap 4 and has, for example, a long, narrow slit or slot shape. By disposing the strap retention device 5 on the outer surface of the retainer 3 like this, the structure of the retainer 3 does not need to be complicated, and the strap retention device 5 is prevented from being subjected to high-temperature gas blown from the inflator 2.

The airbag 1 includes, for example, a pair of side panels 1a disposed at side surfaces of the airbag 1 when inflated and deployed, and a center panel 1b disposed at the central portion of the airbag 1 and connecting the pair of side panels 1a. This airbag 1 is formed of three pieces of base fabric and, thus, has a three-piece structure. The center panel 1b constitutes a surface that comes into contact with the occupant during inflation and deployment of the airbag 1. The side panels 1a each have a normally open vent hole 11. That is, the airbag 1 has a pair of normally open vent holes 11, one provided on the center side of the vehicle and the other provided on the body side of the vehicle. By providing the normally open vent holes 11, gas in the airbag 1 can be discharged to the outside from the normally open vent holes 11 when the occupant collides with the airbag 1. Note that, because the above-described configuration of the airbag 1 is just an example, the configuration of the airbag 1 is not limited thereto.

Furthermore, the airbag 1 has an opening 12 provided in the surface of the airbag 1, a projecting portion 13 disposed so as to communicate with the opening 12, a vent hole 14 provided in the projecting portion 13, the strap 4 joined to the projecting portion 13 at the second end and retained by the strap retention device 5 at the first end, and a slit 15 for guiding the strap 4 to the inside of the airbag 1. The opening 12 is provided in one or both of the side panels 1a. The vent hole 14 is located in an area where the projecting portion 13 overlaps the airbag 1 when the projecting portion 13 is pulled by the strap 4. The strap 4 is configured to pull the projecting portion 13 in a direction away from the occupant during inflation and deployment of the airbag 1. When the occupant is large or heavy, the strap 4 is retained to close the vent hole 14, whereas when the occupant is small or light, the strap 4 is released to open the vent hole 14.

The opening 12 is provided in each of the pair of side panels 1a disposed on the center side and body side (door side) of the vehicle during inflation and deployment of the airbag 1. The projecting portion 13 is sewn on this opening 12 and is configured to be able to stand upright on the surface of the airbag 1 (the side panel 1a). When this projecting portion 13 is made to stand, the vent hole 14 is opened, enabling the internal pressure of the airbag 1 to be reduced. In contrast, when this projecting portion 13 is made to be in close contact with the surface of the airbag 1, the vent hole 14 is closed, enabling the internal pressure of the airbag 1 to be increased. Note that the opening 12 and the projecting portion 13 may be provided only on the center side of the vehicle in the airbag 1.

The strap 4, which has a substantially flat-cord shape, is joined to the projecting portion 13. By retaining or releasing the strap 4 during inflation and deployment of the airbag 1, the projecting portion 13 can be made to stand or brought into close contact with the surface of the airbag 1. The strap 4 is led into the airbag 1 from the slit 15 provided in the airbag 1, passes through the opening 33 in the retainer 3, and is retained by the strap retention device 5 disposed outside the retainer 3, connecting the projecting portion 13 and the strap retention device 5 so as to create a tension T therebetween. The slit 15 may be either a slit or a slot-like opening. Note that the strap retention device 5 may releasably retain either one strap 4 or a plurality of the straps 4.

The strap 4 is formed of, for example, base fabric used for the airbag 1 or webbing used for seatbelts and the like. When the strap 4 is formed of base fabric, for example, a sheet of base fabric is folded several times and sewn together, or a plurality of sheets of base fabric are stacked and sewn together, to form a substantially flat-cord-like strap that can ensure the strength. When the strap 4 is formed of webbing, for example, a piece having a width large enough to ensure the strength is cut out from a sheet of webbing, or a narrow sheet of webbing is fabricated using the same fabricating method as webbing, to form a substantially flat-cord-like strap. Note that the term "strap" includes all components, such as a tether, an anchor rope, a cord-like member, a belt-like member, and a wire, that can create a tension T and can be cut by the cutter 53.

By forming the strap 4 from base fabric or webbing, it is possible to easily obtain a member that satisfies predetermined regulation requirements, such as strength, flame resistance properties, and environmental resistance properties (i.e., the properties of not being deteriorated or degraded in a temperature range of, for example, from −40° C. to 100° C.), in the field of the vehicle safety device, and it is possible to utilize the remainder or scraps of the material used for the vehicle safety devices. In particular, even a material that is unsuitable for the airbag 1 or seatbelts may be reused by an amount needed to form the strap 4. Thus, resources can be effectively utilized.

As shown in FIG. 2, the strap retention device 5 includes the anchor 51, the strap restraint member 52, the cutter 53, the squib 54, the housing 55, the keeper 56, and the O-ring 57.

The anchor 51 is formed of, for example, a substantially L-shaped bracket joined to the outer surface of the retainer 3 by spot welding or the like. The anchor 51 has the flat portion 51b disposed substantially perpendicular to the outer surface of the retainer 3. The flat portion 51b functions as a cutting board (chopping board) when the strap 4 is cut. Furthermore, the retaining portion 51a for retaining the strap 4 is formed of, for example, a bolt 51c, which is inserted through the flat portion 51b and passes through the strap 4, and a nut 51d threaded onto the bolt 51c. By fixing the strap 4 to the anchor 51 using this retaining portion 51a, the movement of the strap 4 in the longitudinal direction can be restricted.

The strap restraint member 52 is configured to reduce the movement of the strap 4 in the width direction, in particular, the rotation about the retaining portion 51a (bolt 51c). More specifically, the strap restraint member 52 is formed of a plate-like stopper 52a disposed on the retaining portion 51a to make the back surface of the strap 4 be in contact with the flat portion 51b, and a guide member 52b joined to the anchor 51, forming a slit through which the strap 4 passes.

The stopper 52a is, for example, formed to have a width larger than the width of the strap 4 and is formed of a component having bent portions disposed on both sides of the strap 4 and an opening through which the bolt 51c is inserted. By letting the bolt 51c pass through the stopper 52a and threading the nut 51d onto the bolt 51c, the pressure-receiving area of the strap 4 can be increased, and the back surface of the strap 4 can be easy brought into contact with the flat portion 51b.

The guide member 52b is joined to, for example, the flat portion 51b, at a position near a bent portion of the anchor 51, and is configured to form a tubular insertion portion with respect to the flat portion 51b. Furthermore, the guide member 52b has a tapered surface that is reduced in diameter at a side of the retaining portion 51a, such that it is close to the cross-section of the strap 4. By making the strap 4 pass through the guide member 52b, it is possible to reduce the movement of the strap 4 in the width direction at a position away from the retaining portion 51a where the strap 4 is fixed to the anchor 51, and it is possible to prevent the rotation of the strap 4.

Then, the strap 4 is cut at a position between the stopper 52a and the guide member 52b. By restraining the strap 4 at both sides of the cutting part of the strap 4 in the longitudinal direction like this, it is possible to prevent the strap 4 at a position in contact with the cutter 53 from shifting. Thus, it is possible to improve the ability to reliably cut the strap 4.

The cutter 53 has a straight blade 53a longer than the width of the strap 4, and a pressure receiving surface 53b for receiving a combustion product generated by the squib 54. For example, the cutter 53 has a dimension at the blade tip of R 0.4 or less, a Rockwell hardness (HRC) of 40 or more, and a blade angle of 45 degree or less. Furthermore, the cutter 53 is formed of a solid block slidable along the inner surface of the housing 55, and an O-ring 57 is disposed on the outer periphery thereof. By disposing the O-ring 57, the airtightness of a space behind the cutter 53 can be improved, and sparks can be prevented from leaking outside. Furthermore, the cutter 53 is positioned by a shear pin 58 inserted from the outside of the housing 55. The shear pin 58 is, for example, a substantially cylindrical member made of resin or metal, which is sheared when being subjected to a predetermined pressure.

The squib 54 comprises, for example, an initiator (a detonator). The initiator is a small pyrotechnic device for generating a combustion product. The initiator is fired by a firing current (firing signal) from the ECU (not shown), burning a composition stored therein and generating a combustion product. The combustion product generated by the initiator pushes the pressure receiving surface 53b of the cutter 53, and, when the shear pin 58 is sheared, the cutter 53 is moved toward the flat portion 51b of the anchor 51. When the straight blade 53a of the cutter 53 comes into contact with the flat portion 51b, the strap 4 is cut on the flat portion 51b.

The housing 55 includes, for example, a cutter accommodating portion 55a having a cylindrical part conforming to the external shape of the cutter 53, a squib accommodating portion 55b having a cylindrical part conforming to the external shape of the squib 54, and flanges 55c extending from the side surfaces of the cutter accommodating portion 55a in the width direction of the strap 4. The housing 55 is, for example, an aluminum die-casting (an ADC material), which is suitable for reducing weight, or a carbon steel pipe for mechanical structure (an STKM material), which is suitable for reducing costs. Furthermore, the cutter accommodating portion 55a has, on the outer surface thereof, an opening through which the shear pin 58 is inserted. A keeper 56 for fixing the squib 54 inserted into the housing 55 is fitted to the outer periphery of the squib accommodating portion 55b and is fixed to the housing 55 by screwing or welding. Furthermore, the housing 55 is joined to the anchor 51 with bolts 55d inserted through the flanges 55c and the flat portion 51b of the anchor 51, and nuts 55e threaded onto the bolts 55d. The bolts 55d may be stud bolts provided upright on the flat portion 51b of the anchor 51.

Now, the operation of the above-described strap retention device 5 will be described. As shown in FIG. 3A, the housing 55 is disposed substantially perpendicular to the flat portion 51b of the anchor 51. The strap 4 is held and retained by the anchor 51 (the retaining portion 51a) and the strap restraint member 52 (the stopper 52a and the guide member 52b) such that the back surface thereof is in contact with the flat portion 51b. The cutter 53 is fixed to the housing 55 with the shear pin 58, leaving a certain distance from the surface of the strap 4. Furthermore, a space to be filled with the combustion product is formed between the cutter 53 and the squib 54. Before the squib 54 is activated, or while the strap 4 needs to be retained, the state shown in FIG. 3A is maintained, and the strap 4 is retained by the strap retention device 5.

When the squib 54 is activated, or when the strap 4 is released, the ECU transmits a firing signal to the squib 54 through a harness 54a, and the squib 54 instantaneously generates the combustion product. The space between the squib 54 and the cutter 53 is filled with the combustion product, and the pressure receiving surface 53b of the cutter 53 is pushed in a direction toward the anchor 51. Once the force of the combustion product exceeds a predetermined level, as shown in FIG. 3B, the shear pin 58 is sheared, and the cutter 53 moves toward the anchor 51 along the housing 55. Then, the straight blade 53a of the cutter 53 reaches the strap 4 on the flat portion 51b of the anchor 51, cutting the strap 4 by urging it against the flat portion 51b. By the cutter 53 reaching the flat portion 51b, the cutter 53 completes cutting the strap 4 and stops. The cut strap 4 is released from the strap retention device 5 and moves by being pulled in the direction of the tension T.

Now, the control for retaining and releasing the strap 4 of the airbag device 10 shown in FIG. 1 will be described with reference to FIGS. 4A and 4B.

When an occupant P is large (for example, a male adult), as shown in FIG. 4A, the occupant is usually heavy and, thus, generates a large inertial force during an abrupt slowdown of a vehicle. Therefore, the internal pressure of the airbag 1 needs to be increased to receive the occupant P. Hence, the strap 4 is kept retained by the strap retention device 5, keeping the projecting portion 13 closed. When the projecting portion 13 is closed, the gas supplied from the inflator 2 to the airbag 1 is discharged only from the normally open vent holes 11. Thus, the amount of gas discharged can be reduced. Accordingly, the internal pressure of the airbag 1 can be easily increased.

When the occupant P is small (for example, a small female adult or a child), as shown in FIG. 4B, the occupant is usually light and, thus, generates a small inertial force during an abrupt slowdown of a vehicle. Therefore, the internal pressure of the airbag 1 needs to be decreased to receive the occupant P while reducing the impact. Hence, the strap 4 is released by the strap retention device 5, keeping the projecting portion 13 open. When the projecting portion 13 is open, the gas supplied from the inflator 2 to the airbag 1 is discharged both from the normally open vent holes 11 and the vent hole 14 provided in the projecting portion 13. Thus, the amount of gas discharged can be increased. Accordingly, the internal pressure of the airbag 1 can be easily reduced.

Whether the occupant P is large or small can be easily determined by, for example, a seat load sensor 102 connected to the ECU (electronic control unit) 101. The seat load sensor 102 is disposed, for example, in a passenger's seat 103, on which the occupant P is seated. Furthermore, the body size of the occupant P may be determined by using image processing means utilizing a seat position sensor, a CCD camera installed in the vehicle, etc., instead of the seat load sensor 102.

At the time when the occupant P is seated on the passenger's seat 103, the seat load sensor 102 determines whether the occupant P is large or small, or whether the occupant P is heavy or light, and the result is stored as occupant body information in an ECU 101. The occupant body information is, for example, information that identifies the occupant P as a person having a large body if the occupant P is heavier than a weight threshold set in advance and that identifies the occupant P as a person having a small body if the occupant P is lighter than the threshold. When the ECU 101 detects or predicts a collision or an abrupt slowdown of the vehicle, it controls the strap retention device 5 on the basis of the occupant body information to control the retaining or releasing of the strap 4. More specifically, the strap retention device 5 is configured to retain the strap 4 when the occupant P is large or heavy and to release the strap 4 when the occupant P is small or light.

Figure 5:
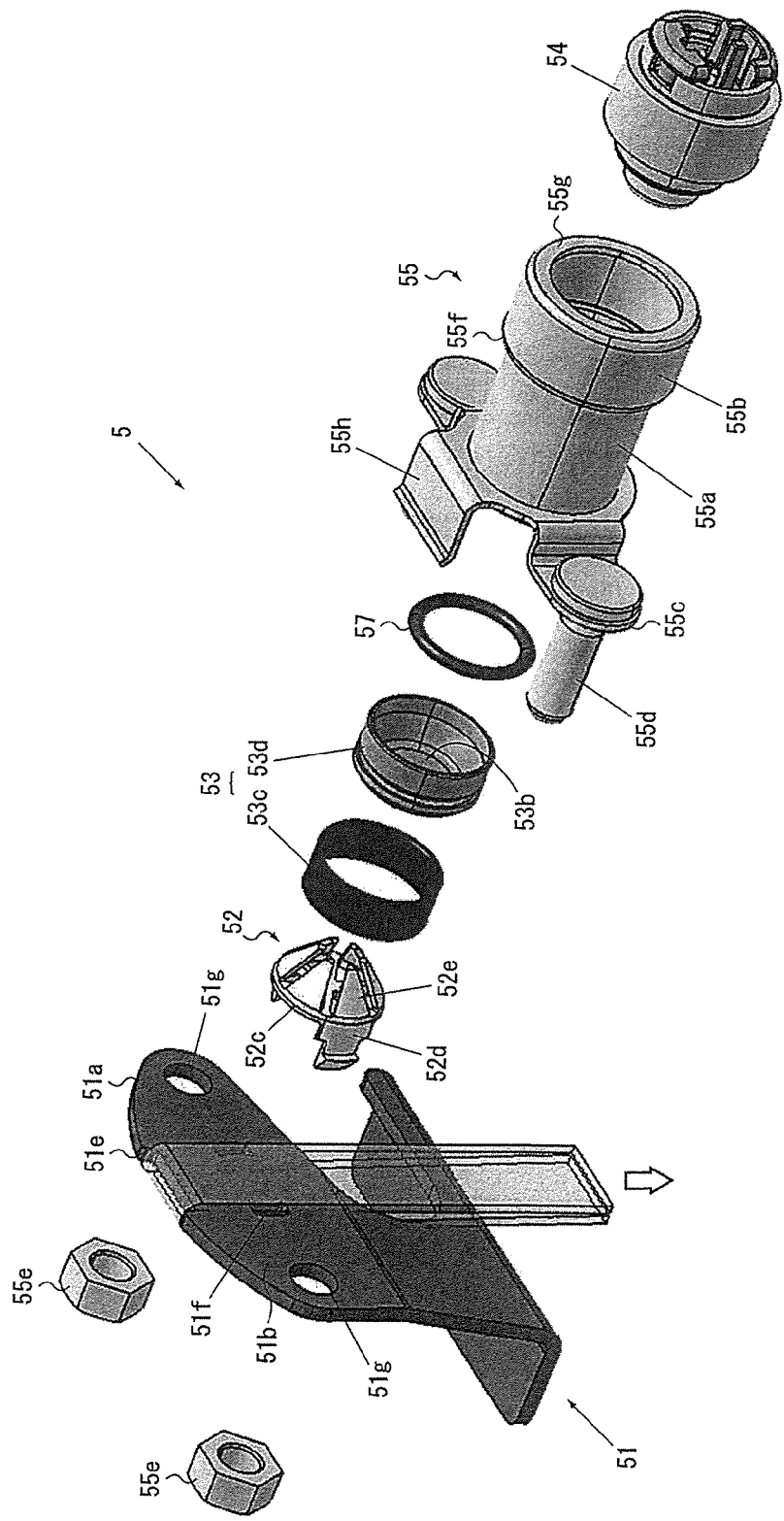
FIG. 5 is a diagram showing the configuration of components of a strap retention device according to a second embodiment of the present invention.
Figure 6A:
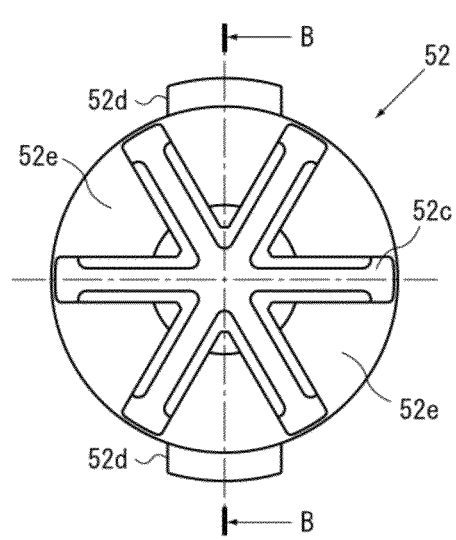
Figure 6B:
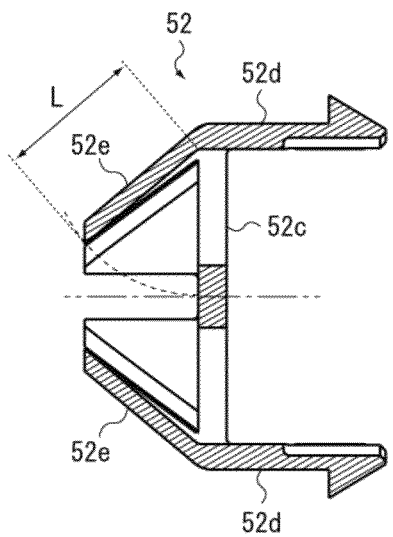
Figure 6C:
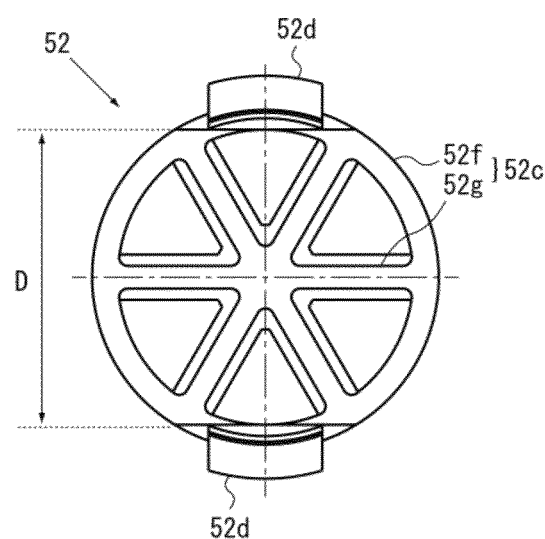

Next, a strap retention device 5 according to a second embodiment will be described. FIG. 5 is a diagram showing the configuration of components of a strap retention device according to a second embodiment of the present invention. FIGS. 6A-6C are diagrams of the strap restraint member shown in FIG. 5, wherein FIG. 6A is a front view, FIG. 6B is a cross-sectional view taken along line B-B in FIG. 6A, and FIG. 6C is a back view. FIGS. 7A and 7B are diagrams showing the operation of the strap retention device shown in FIG. 5, wherein FIG. 7A shows a retained state, and FIG. 7B shows a released state. Note that the same components as those of the strap retention device 5 according to the above-described first embodiment are denoted by the same reference numerals, and overlapping descriptions will be omitted.

As shown in FIGS. 5-7, the strap retention device 5 according to the second embodiment includes, similarly to the strap retention device 5 according to the first embodiment, an anchor 51 having a retaining portion 51a for retaining the first end of the strap 4 and a flat portion 51b in contact with a back surface of the strap, a strap restraint member 52 joined to the anchor 51 for restraining the movement of the strap 4 in the width direction, a cutter 53 for cutting the strap 4 on the flat portion 51b, a squib 54 for applying a driving force to the cutter 53 to move the cutter 53 in a direction of the flat portion 51b, and a housing 55 accommodating the cutter 53 and the squib 54 and joined to the anchor 51. Note that, for the ease of explanation, the strap retention device 5 shown in FIG. 5 is inverted from that of the strap retention device 5 shown in FIG. 2.

The retaining portion 51a of the anchor 51 comprises, for example, a hook portion engageable with the first end of the strap 4 formed in a loop. The hook portion (retaining portion 51a) is configured to allow the loop-like portion of the strap 4 to be inserted from an open end thereof, by removing a part of the flat portion 51b. Furthermore, a recess 51e is formed in an edge of the hook portion (retaining portion 51a) at a position where the strap 4 is retained, so that the first end of the strap 4 can be secured. Furthermore, the surface of the hook portion (retaining portion 51a), i.e., the flat portion 51b, has a pair of through-holes 51f and a pair of bolt holes 51g for fixing the housing 55, at positions adjacent to both sides of the strap 4.

The cutter 53 includes, for example, a tubular cutter body 53c disposed along the inner surface of the housing 55 and having a diameter larger than the width of the strap 4, and a piston 53d disposed at the rear end of the cutter body 53c and having a pressure receiving surface 53b for receiving a combustion product generated by the squib 54. By making the cutting edge of the cutter 53 hollow like this, the cutter 53 can be reduced in weight, enabling reduction in size and weight of the entire device. Although the cutter body 53c is formed of a cylindrical steel pipe, for example, it is not limited to such a configuration. The piston 53d is formed of, for example, a metal material or a resin material having pressure resistant properties and heat resistant properties. Although the cutter body 53c and the piston 53d are formed as separate components herein, they may be formed as a single component. Furthermore, an O-ring 57 is disposed on the outer periphery of the piston 53d.

As shown in FIGS. 5 and 6, the strap restraint member 52 includes a body 52c able to be disposed inside the cutter body 53c and able to contact the surface of the strap 4, and claws 52d formed on the body 52c at positions adjacent to both sides of the strap 4 and engageable with the anchor 51. The body 52c includes flaps 52e formed so as to be foldable toward the cutter body 53c in a flat shape and reducing the movement of the piston 53d before the squib 54 is activated. The strap restraint member 52 positions the strap 4 inside the cutter 53 (cutter body 53c) to allow the cutter body 53c, which moves along the outer periphery of the body 52c, to cut the strap 4 on the outer side of the body 52c. With this configuration, it is possible to restrain the strap 4 at a position close to the cutting part of the strap 4, and, hence, it is possible to effectively suppress the displacement of the strap 4.

More specifically, as shown in FIGS. 6A-6C, the body 52c includes a circular edge 52f having an outside diameter smaller than the inside diameter of the cutter body 53c, and a plurality of support members 52g radially disposed on the inner side of the edge 52f. The body 52c may be formed of a circular disc having an outside diameter smaller than the inside diameter of the cutter body 53c.

The claws 52d are provided upright at both ends of the body 52c, are inserted into the through-holes 51f in the hook portion (retaining portion 51a), and are engaged with the hook portion (retaining portion 51a), at barbs formed at the tips of the claws 52d. As shown in FIG. 6C, the distance D between the claws 52d is set slightly larger than the width of the strap 4. Thus, by engaging the claws 52d with the hook portion (retaining portion 51a), the strap 4 is enclosed by the claws 52d, the body 52c, and the flat portion 51b, whereby the movement of the strap 4 (especially, the movement in the width direction) is restricted.

The flaps 52e are components that serve as spacers for the piston 53d. As shown in FIG. 6A, a plurality (six, in the figure) of the flaps 52e are arranged at predetermined intervals on the edge of the body 52. As shown in FIG. 6B, each flap 52e is substantially triangular and is disposed so as to be inclined from the edge of the body 52c toward the center. The flaps 52e have such a length L that they do not overlap one another when pressed toward the body 52c. By forming these flaps 52e, even if the piston 53d moves toward the strap 4 due to vibrations or the like before the squib 54 is activated, the flaps 52e contact a surface of the piston 53d opposite to the pressure receiving surface 53b, suppressing the movement of the piston 53d. Therefore, it is possible to suppress the movement of the cutter body 53c before the squib 54 is activated, and hence, to suppress unintended cutting of the strap 4. Furthermore, because the flaps 52e are disposed inside the body 52c, i.e., inside the cutter body 53c, the flaps 52e do not inhibit the movement of the cutter body 53c when the squib 54 is activated. Moreover, because the flaps 52e are configured to be foldable in a substantially flat shape, when the squib 54 is activated and applies a high pressure to the piston 53d, the flaps 52e are pushed toward the body 52c by the piston 53d. Thus, the movement of the piston 53d is not inhibited when the squib 54 is activated.

The housing 55 includes a cutter accommodating portion 55a accommodating the cutter 53 (the cutter body 53c and the piston 53d), a squib accommodating portion 55b, a step portion 55f for positioning the tip of the squib 54 inserted into the squib accommodating portion 55b, and an engaging portion 55g engaged with the rear end of the squib 54 by caulking. The engaging portion 55g before the squib 54 is accommodated has such a shape that the squib accommodating portion 55b is extended. After the squib 54 is accommodated in the squib accommodating portion 55b, the engaging portion 55g is engaged with the squib 54 by caulking. With this configuration, the keeper 56 shown in FIG. 2 can be omitted, enabling reduction in weight of the housing 55, and hence, reduction in size and weight of the device.

A protecting portion 55h projecting forward is formed at an end of the housing 55. The protecting portion 55h is formed to cover above the recess 51e in the hook portion (retaining portion 51a) when the housing 55 is joined to the anchor 51. With this configuration, the strap 4 fitted to the recess 51e can be prevented from being displaced beyond the recess 51e. Note that the housing 55 is joined to the anchor 51 by inserting the bolts 55d inserted through or provided upright on the flanges 55c into the bolt holes 51g in the anchor 51, and by threading the nuts 55e thereon.

Now, the operation of the strap retention device 5 according to the above-described second embodiment will be described. As shown in FIG. 7A, the housing 55 is disposed substantially perpendicular to the flat portion 51b of the anchor 51. The strap 4 is retained by the strap restraint member 52 such that the back surface thereof is in contact with the flat portion 51b. The piston 53d is press-fitted to the housing 55 with the O-ring 57 therebetween, leaving a certain distance from the surface of the strap 4. Between the piston 53d and the strap 4 is provided the strap restraint member 52 having the flaps 52e. The cutter body 53c is fixed in the space between the outer periphery of the piston 53d and the inner periphery of the housing 55 by press-fitting or the like. Before the squib 54 is activated, or while the strap 4 needs to be retained, the state shown in FIG. 7A is maintained, and the strap 4 is retained by the strap retention device 5.

When the squib 54 is activated, or when the strap 4 is released, the ECU transmits a firing signal to the squib 54 through a harness 54a, and the squib 54 instantaneously generates the combustion product. The space between the squib 54 and the cutter 53 (piston 53d) is filled with the combustion product, and the piston 53d is pushed in the direction toward the anchor 51. Once the force of the combustion product exceeds a predetermined level, as shown in FIG. 7B, the piston 53d moves toward the anchor 51 while pushing the flaps 52e of the strap restraint member 52 and, at the same time, causes the cutter body 53c to move toward the anchor 51. Then, the cutter body 53c reaches the strap 4 on the flat portion 51b of the anchor 51, cutting the strap 4 by urging it against the flat portion 51b. By the cutter body 53c reaching the flat portion 51b, the cutter body 53c completes cutting the strap 4 and stops. The cut strap 4 is released from the strap retention device 5 and moves by being pulled in the direction of the tension T.

Figure 8A:
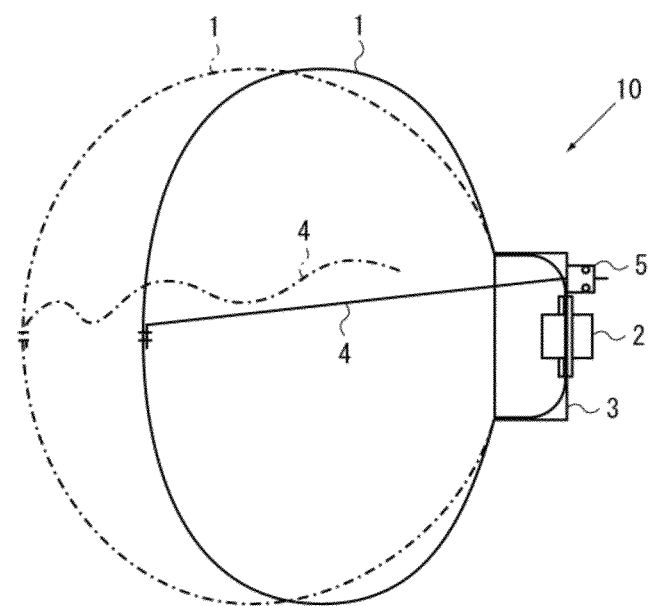
Figure 8B:
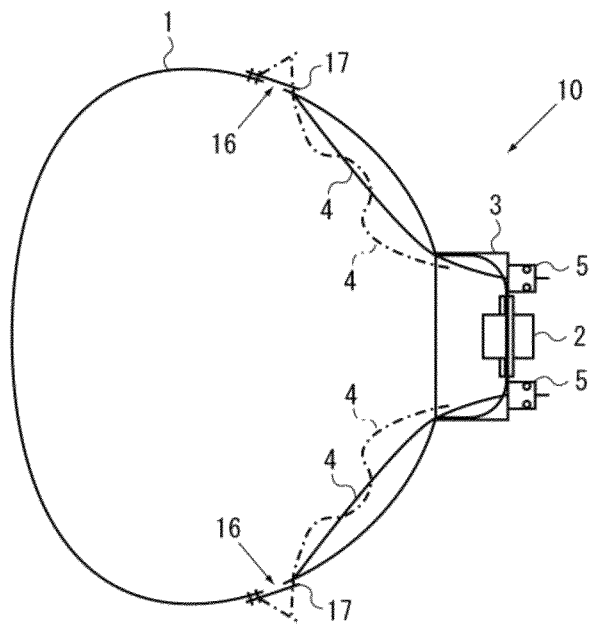

Next, another embodiment of the above-described airbag device 10 will be described. Herein, FIGS. 8A and 8B are diagrams of airbag devices according to other embodiments, wherein FIG. 8A shows the second embodiment, and FIG. 8B shows a third embodiment. Note that the same components as those of the airbag device 10 according to the above-described first embodiment are denoted by the same reference numerals, and overlapping descriptions will be omitted.

As shown in FIG. 8A, in the airbag device 10 according to the second embodiment, the strap 4 restricts the width of the airbag 1 during inflation and deployment. If the strap 4 is retained by the strap retention device 5, it is controlled such that the apex of the airbag 1 is pulled by the strap 4, and the width in a direction toward the occupant is reduced, as indicated by a solid line in the figure. On the other hand, if the strap 4 is released from the strap retention device 5, it is controlled such that the apex of the airbag 1 is inflated and deployed toward the occupant, as indicated by a one-dot chain line in the figure.

As shown in FIG. 8B, in the airbag device 10 according to the third embodiment, the straps 4 control opening and closing of vent holes 16 in the airbag 1. If the straps 4 are retained by the strap retention devices 5, valves 17 sewn to the airbag 1 are pulled such that they are brought into close contact with the surface of the airbag 1, closing the vent holes 16, as indicated by a solid line in the figure. On the other hand, if the straps 4 are released from the strap retention devices 5, the valves 17 are separated from the surface of the airbag 1, opening the vent holes 16, as indicated by a one-dot chain line in the figure. In the case of the airbag 1 having a plurality of the straps 4, as shown in FIG. 8B, a plurality of the strap retention devices 5 may be disposed.

Although, the cases where the strap retention device 5 is applied to the airbag device 10 have been described in the above-described embodiments, the strap retention device 5 may be applied to a vehicle safety device, such as a seatbelt device, or it may be applied to a device other than the vehicle safety device. Furthermore, the airbag device 10 is not limited to the passenger airbag device, but may be a driver's seat airbag device, a side airbag device, a curtain airbag device, a knee airbag device, or a pedestrian airbag device.

The present invention is not limited to the above-described embodiments, but may of course be variously modified within a scope not departing from the spirit of the present invention.

What is claimed is:

1. A strap retention device for releasably retaining a first end of a strap having a second end connected to a movable object, the strap retention device comprising:
   an anchor having a retaining portion for retaining the first end of the strap, and a flat portion in contact with a back surface of the strap;
   a strap restraint member joined to the anchor for restraining movement of the strap in a width direction;
   a cutter for cutting the strap on the flat portion;
   a squib for applying a driving force to the cutter to move the cutter in a direction of the flat portion; and
   a housing accommodating the cutter and the squib and joined to the anchor.

2. The strap retention device according to claim 1, wherein the cutter has a straight blade longer than a width of the strap, and a pressure receiving surface for receiving a combustion product generated by the squib.

3. The strap retention device according to claim 2, wherein the cutter is positioned by a shear pin inserted from an outside of the housing.

4. The strap retention device according to claim 3, wherein the strap restraint member includes a plate-like stopper disposed on the retaining portion to make the back surface of the strap be in contact with the flat portion, and a guide member joined to the anchor and forming a slit through which the strap passes, and
wherein the strap is cut at a position between the stopper and the guide member.

5. The strap retention device according to claim 1, wherein the cutter includes a tubular cutter body disposed along an inner surface of the housing and having a diameter larger than the width of the strap, and a piston disposed at a rear end of the cutter body and having a pressure receiving surface for receiving a combustion product generated by the squib.

6. The strap retention device according to claim 5, wherein the strap restraint member includes a body having a size capable of being disposed inside the cutter body and able to contact a surface of the strap, and claws formed on the body so as to be adjacent to both sides of the strap and engageable with the anchor; and
wherein the strap is cut on an outside of the body.

7. The strap retention device according to claim 6, wherein the body includes a flap formed so as to be foldable toward the cutter body in a flat shape and reducing movement of the piston before the squib is activated.

8. The strap retention device according to claim 1, wherein the retaining portion includes a bolt inserted through the flat portion and penetrating the strap, and a nut threaded onto the bolt; or
wherein the retaining portion includes a hook portion engageable with the first end of the strap formed in a loop.

9. The strap retention device according to claim 1, wherein the housing includes a step portion for positioning a tip of the squib inserted therethrough, and an engaging portion engaged with a rear end of the squib by caulking, or a keeper for fixing the squib inserted into the housing.

10. The strap retention device according to claim 1, wherein the strap is made of base fabric or webbing.

11. An airbag device comprising:
an airbag that is normally folded and is inflated and deployed in an emergency;
an inflator for supplying gas to the airbag;
a retainer for holding the airbag and the inflator; and
a strap retention device for releasably retaining a first end of the strap having a second end connected to the airbag,
wherein the strap retention device includes the strap retention device according to claim 1.

12. The airbag device according to claim 11,
wherein the retainer has an opening through which the first end of the strap is led outside; and
wherein the strap retention device is disposed on an outer surface of the retainer at a position adjacent to the opening.

* * * * *